United States Patent [19]

Horimoto et al.

[11] Patent Number: 5,436,094
[45] Date of Patent: Jul. 25, 1995

[54] BULKY SYNTHETIC PULP SHEET USEFUL AS A SEPARATOR FOR SEALED LEAD BATTERIES AND PROCESS FOR PREPARING THE SAME

[75] Inventors: Koji Horimoto; Makoto Nakamaru; Yukio Kohno, all of Chiba, Japan

[73] Assignee: Mitsui Petrochemical Industries, Ltd., Tokyo, Japan

[21] Appl. No.: 214,693

[22] Filed: Mar. 18, 1994

[30] Foreign Application Priority Data

Mar. 19, 1993 [JP] Japan .................. 5-60321
Mar. 19, 1993 [JP] Japan .................. 5-60322
Aug. 6, 1993 [JP] Japan .................. 5-196397

[51] Int. Cl.⁶ .............................................. H01M 2/16
[52] U.S. Cl. .............................. 429/254; 162/146; 162/157.5; 162/207; 428/131; 428/288; 428/304.4; 428/323; 428/327; 429/247
[58] Field of Search .................... 162/146, 157.5, 207; 428/288, 131, 373, 327, 304.4, 323; 429/247, 248, 254

[56] References Cited

U.S. PATENT DOCUMENTS

| | | | |
|---|---|---|---|
| 2,999,788 | 9/1961 | Morgan | 162/146 |
| 3,007,840 | 11/1961 | Wilcox | 162/101 |
| 5,139,861 | 8/1992 | Williams et al. | 428/327 |
| 5,167,764 | 12/1992 | Nielsen | 428/288 |
| 5,284,703 | 2/1994 | Everhart et al. | 428/288 |
| 5,292,581 | 3/1994 | Viazmensky | 428/288 |
| 5,300,192 | 4/1994 | Hansen | 428/288 |
| 5,324,575 | 6/1994 | Sultze et al. | 428/288 |

Primary Examiner—James J. Bell
Attorney, Agent, or Firm—Birch, Stewart, Kolasch & Birch

[57] ABSTRACT

A bulky synthetic pulp sheet which does not lose its shape even after having absorbed a liquid and has excellent resistance against to chemicals such as acids and alkalis, and a process for preparing the same, which pulp sheet contains 5 to 95% by weight of a synthetic pulp having a drainage factor over a range of from 0.1 to 2.0 sec/g, and 5 to 50% by weight of a polymer binder having a melting point lower than a melting point or a decomposition temperature of said synthetic pulp, the sheet being obtained by subjecting a mixture of the synthetic pulp and fibrous binder to wet laid sheet-making followed by a heat treatment, and having an apparent density of 0.15 g/cm³ or smaller under the load of 200 g/cm².

27 Claims, 1 Drawing Sheet

BULKY SYNTHETIC PULP SHEET USEFUL AS A SEPARATOR FOR SEALED LEAD BATTERIES AND PROCESS FOR PREPARING THE SAME

BACKGROUND OF THE INVENTION

1) Field of the Invention

The present invention relates to a process for preparing a bulky synthetic pulp sheet which does not lose shape even after having absorbed liquid and to a process for preparing the same. More specifically, the invention relates to a bulky synthetic pulp sheet having excellent resistance against chemicals such as acids, alkalis, etc. in addition to the above-mentioned property and to a process for preparing the same. The invention further relates to a sealed-type lead battery and a separator for cells.

2) Description of the Related Art

Methods have heretofore been proposed for preparing bulky sheets that are used for absorbing liquids or are used as buffer members for imparting elasticity. These methods use a cellulose pulp as a chief material and further add, for example, folded synthetic fibers (Japanese Laid-Open Patent Publication No. 132900/1989) or three-dimensionally crimped synthetic resin fibers (Japanese Laid-Open Patent Publication No. 269199/1991) in order to impart bulkiness.

However, these bulky sheets which are chiefly composed of a cellulose pulp are inferior in resistance against chemicals, and are not suited for such applications as absorbing and holding strongly acidic liquids such as sulfuric acid and the like acid.

Therefore, it has been strongly demanded to provide articles capable of absorbing chemicals that are leaked or spilled and capable of holding an electrolyte therein, like a separator used in a sealed-lead battery, that can be cheaply produced and used safely.

SUMMARY OF THE INVENTION

The object of the present invention is to provide a synthetic pulp sheet which is bulky, holds a liquid favorably, has excellent dimensional stability yet flexible, does not lose the shape even in a water-absorbed condition, and is stable against acids and alkalis.

Another object of the present invention is to provide a separator for sealed-lead storage batteries which favorably holds sulfuric acid also, holds electrolytes substances during the charge and discharge being inserted among the electrode plates, and works to effectively prevent them from leakage.

A further object of the present invention is to provide a process for easily preparing a bulky open-cell foam porous and liquid-holding synthetic pulp sheet using a cheaply available material.

According to the present invention, there is provided a bulky synthetic pulp sheet containing 50 to 95% by weight of a synthetic pulp having a drainage factor over a range of from 0.1 to 2.0 sec/g, 5 to 50% by weight of a polymer binder having a melting point lower than a melting point or a decomposition temperature of said synthetic pulp and, if required, 40% by weight or less of auxiliary fibers, said sheet being obtained by subjecting a mixture of said synthetic pulp and said fibrous binder to the wet-laid sheet-making and to the heat treatment, and having an apparent density of 0.15 g/cm$^3$ or smaller under the load of 200 g/cm$^2$.

The present invention further provides a process for preparing a bulky synthetic pulp sheet by subjecting to the wet-laid sheet-making on a wire an aqueous slurry of a mixture of 50 to 95% by weight of a synthetic pulp having a drainage factor over a range of from 0.1 to 2.0 sec/g, 5 to 50% by weight of a polymer binder having a melting point lower than a melting point or a decomposition temperature of said synthetic pulp and, if required, 40% by weight or less of auxiliary fibers spraying a surfactant on the wet sheet during the wet-laid sheet-making prior to the dehydration, dehydrating the wet sheet by suction and/or by pressing, drying the sheet and then heat-treating the sheet.

DETAILED DESCRIPTION OF THE INVENTION

Figure 1:
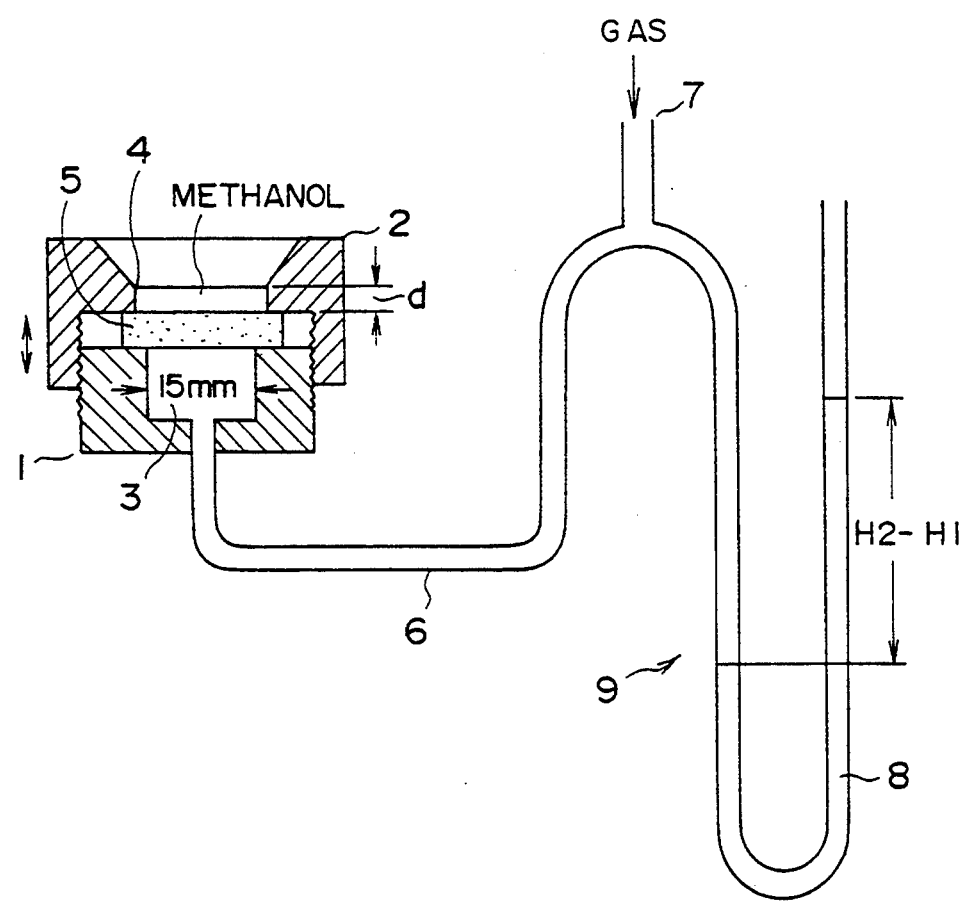
FIG. 1 illustrates the arrangement of an apparatus used for measuring a maximum pore diameter of the synthetic pulp sheet of the present invention.

The synthetic pulp sheet of the present invention is prepared by subjecting a mixture containing a synthetic pulp, a binder and, if required, auxiliary fibers to the wet-laid sheet-making and to the heat treatment for thermal melt-adhesion, and has a feature in that the synthetic pulp sheet is very bulky having an apparent density of 0.15 g/cm$^3$ or less under a load of 200 g/cm$^2$. Owing to this bulky structure, the synthetic pulp sheet of the present invention favorably holds a liquid, and exhibits a water-holding factor of 600% or greater and, particularly, 900% or greater. Therefore, though light in weight, the sheet of the present invention is capable of holding an electrolyte such as sulfuric acid in large amounts and is particularly useful as a separator for sealed-lead batteries.

Moreover, the synthetic pulp sheet is made of a synthetic pulp having excellent resistance against chemicals and, besides, the synthetic pulp fiber is fixed by the binder that is thermally melt-adhered. Therefore, not only the fiber itself exhibits excellent resistance against chemicals but also the porous structure remains stable under the condition of holding a liquid such as acid and does not lose the shape.

The synthetic pulp sheet of the present invention has a fine and uniform porous structure despite it has a bulky structure as described above. The fineness can be evaluated in terms of a maximum porous diameter measured by the method that will be described later in detail. That is, the synthetic pulp sheet of the present invention has a maximum pore diameter which is as fine as 50 μm or smaller and, particularly, 30 μm or smaller and, accordingly, has a Garle air permeability (as a measure of porosity) of 5 sec/300 ml or smaller and, particularly, 3 sec/300 ml or smaller.

Among all high molecular materials, the fiber has a large strength per a unit sectional area and is rich in flexibility and freedom. According to the present invention, a synthetic pulp of branched fibers having fine fiber diameters is formed into a bulky sheet of a fine texture, gives not only good holdability of electrolytes, ion passability, and intimate adherability to the electrodes, but also shuts off substances eliminated from the electrodes, and supplies the electrolytes to the electrodes.

in the synthetic pulp sheet of the present invention, the above-mentioned bulky, fine and uniform porous structure stems from the fact that the synthetic pulp exists in the sheet in the form of a fine pulp fiber as well as that part of the fibrous binder exists in the form of a netting which bonds the fibers of the synthetic pulp together while the rest of the fibrous binder exists in the form of a fiber. It is also due to the fact that the binder bids the fibers to form a net structure.

Synthetic Pulp

The synthetic pulp which is a chief material used in the present invention has resistance against chemicals such as acids, alkalis, etc. The synthetic pulps are those obtained from homopolymers of olefins such as a polyethylene, a polypropylene and the like; polyolefins such as copolymers of an ethylene and other α-olefins, like an ethylene-propylene copolymer, an ethylene-1-butene copolymer, an ethylene-4-methylpentene-1 copolymer and the like; resins such as a polystyrene, a polymethyl methacrylate and a polyacrylonitrile; a vinyl chloride resin; a vinylidene chloride resin; and polymers such as a nylon, a polyester and a polyfluoroethylene. Among them, crystalline polyolefin synthetic pulps such as a high density polyethylene (HDPE) and a polypropylene are favorably used since they are excellent in resistance against chemicals, have large mechanical strength and are cheaply available.

Though a method for preparing a polyolefin-type synthetic pulp has been disclosed in detail in Encyclopedia of Chemical Technology, 3rd ed. Vol. 19, pp. 420–425, there can be further exemplified a method in which a melt-spun fiber is cut short and is then beated and a method in which a fiber is beated after the flashing with a solution or the flashing with an emulsion.

Among them, those prepared by the method of emulsion flashing using a polyvinyl alcohol (PVA) as a hydrophilic agent can be preferably used in this case, PVA should be contained in an amount of from 0.01 to 10% by weight.

The fiber should have a length of usually from 0.1 to 10 mm, and an average diameter of from 0.1 to 200 μm.

According to the present invention., it is desired to use a synthetic pulp having a drainage factor of from 0.1 to 2.0 sec/g and, particularly, from 0.1 to 1.0 sec/g. That is, when the synthetic pulp has a drainage factor of smaller than 0.1 sec/g, the entanglement among the fibers is not sufficient, making it virtually difficult to carry out the wet-laid sheet-making. When the drainage factor exceeds 1.0 sec/g, on the other hand, the fibers adhere to each other too intimately during the wet-laid sheet-making, and it is not allowed to obtain a bulky sheet as desired.

Furthermore, the synthetic pulp that is used should have a specific surface area (BET) of 0.1 $m^2/g$ or more and, particularly, 1 $m^2/g$ or more from the standpoint of obtaining a highly bulky sheet.

As the synthetic pulp, there can be used a crimped synthetic pulp alone or the crimped synthetic pulp in combination with an ordinary synthetic pulp. A crimped polyolefin pulp is preferably used. The degree of crimping of the pulp fiber can be expressed by a ratio of the length of the fiber of a straight state before crimping to the length of the fiber of the crimped state. It is desired to use a crimped synthetic pulp having this ratio over a range of from 2/10 to 8/10. By using the crimped synthetic pulp, it is allowed to prepare a sheet having an apparent density which is smaller than that obtained by using the uncrimped synthetic pulp ad having good water-holding property.

The comped synthetic pulp may be obtained, for example, by dispersing an uncrimped polyolefin synthetic pulp in a medium consisting of a poor solvent of this resin at a temperature which is higher than the temperature of a rising point on a melt curve that is obtained when the synthetic pulp is measured using DSC (Diffraction Scanning Calorimeter) but is lower than a value expressed by the rising point+(melting point−rising point)×$\frac{3}{4}$, and then flashing the medium into the atmospheric pressure or into a reduced pressure.

Speaking more concretely, the poor solvent of the synthetic pulp is heated at a temperature which is higher than the temperature of a rising point on a melt curve that is obtained when the synthetic pulp is measured using DSC but is lower than a value expressed by the rising point+(melting point−rising point)×$\frac{3}{4}$, and the synthetic pulp is dispersed therein. In this case, the synthetic pulp has a concentration of 100 g/liter or smaller and, preferably, 40 g/liter or smaller. Though the lower limit can be further decreased, it is desired that the concentration of the synthetic pulp is greater than about 10 g/liter from the standpoint of yield.

Then, the dispersion liquid is flashed into the atmospheric pressure or into a reduced pressure through an orifice. In this case, the pressure difference before and after the orifice should be 0.5 $kgf/cm^2$ or greater and, preferably, 3 $kgf/cm^2$ or greater. When the pressure difference is small, the synthetic pulp fiber is not crimped to a sufficient degree. Furthermore, the orifice should have a diameter of larger than 3 mm but smaller than 30 mm. When the diameter of the orifice is smaller than 3 mm, the orifice is clogged with the synthetic pulp and the flashing is not carried out.

Binder

The polymer binder used in the present invention has a melting point which is lower than a melting point or a decomposition temperature of the synthetic pulp as a chief material and preferably has a melting point which is lower by at last 5° C. than the melting point of the synthetic pulp. Such polymer binder may be at least one member selected from synthetic pulps, synthetic fibers, sheath-core type composite fibers having a core portion as a main material with a higher melting point than the melting point of the synthetic pulp and a sheath portion with a lower melting point than the synthetic pulp as the chief material, resin powders and emulsions. A known type of polymer may be used for the binder polymer material, such as a polyester type, a polyolefin type, an polyamide type, an acrylic type and a vinyl chloride type. The fibrous polymer binder is selected from those having melting points of from 60° to 200° C. and, particularly, from 80° to 150° C. depending upon the kind of the synthetic pulp as chief material.

The low-melting point melt-adhering fiber usually comprises a copolymer obtained by introducing into a fiber-forming polymer a copolymerizable component for lowering the melting point. Moreover, a blend of two or more copolymers having main recurring units in common but having different copolymerizable components, is effective for lowering the melting point without substantially losing the properties.

The polyester-type melt-adhering fiber chiefly comprises an ethylene terephthalate recurring unit and further contains in a polymer chain thereof a dibasic acid component other than a terephthalic acid, such as an isophthalic acid, an adipic acid, a sebacic acid, a succinic acid, a dodecanedicarboxylic acid, or a cyclohexaedicarboxylic acid, and ester units derived from diols other than an ethylene glycol, such as a propylene glycol, a 1,4-butanediol, a neopentyl glycol, a cyclohexane dimethanol, a diethylene glycol, and a triethylene glycol. Preferred copolymer ester fibers are those of an ethylene terephthalate/isophthalate copolymer and an ethylene terephthalate/isophthalate/adipate copolymer. The copolymer components are usually contained in an amount of from 2 to 50% by weight.

A low-melting point polyester fiber is available as MELTY® 3300 (melt-adhering temperature, 130° C. which is placed in the market by Unitika Co.

The polyolefin-type melt-adhering fiber is made of a copolymer which chiefly comprises an ethylene recurring unit and with which is further copolymerized an α-olefin and, particularly, an olefin having 3 to 6 carbon atoms, such as a butene-1, a pentene-1, a hexene-1, an octene-1, or a 4-methylpenetene-1. The copolymer contains the α-olefin in an amount of usually from 0 to 20% by weight.

As the nylon-type melt-adhering fiber, there can be used a low-melting point copolyamide or a blend thereof. In general, the melting point of the polyamide tends to decrease with an increase in the number of carbon atoms per a nitrogen atom of amide, and further decreases when other amide recurring units are incorporated. As the nylon-type melt-adhesive fiber, therefore, use is made of the one which chiefly comprises one or two or more kinds of an ω-aminocarboxylic acid having 11 or more carbon atoms such as a 11-aminoundecanoic acid, a 2-aminolauric acid or a 13-aminododecanoic acid and a higher diamine dicarboxylate such as a dodecane diamine dodecanedicarboxy ate, which, as required, is polycondensed with copolymerizable components such as an ω-aminocarboxylic acid like an ω-aminocaproic acid, and with a hexamethylenediamine adipate or hexamethylenediamine sebacate.

Preferred low-melting point nylon-type melt-adhering fibers are available in the trade name of Elder produced by Toray Co., and in the trade name of Elder produced by Unitika Co.

in the synthetic pulp sheet of the present invention, the binder should preferably be formed in the form of a net structive by bonding the fibers of the synthetic pulp together while the rest of the binder should exist in the form of a fiber. The synthetic pulp sheet having such a structure due to the heat treatment remains bulky yet stable without losing the shape even in the state of holding the liquid.

in this sense, it is desired that the fibrous binder should preferably be have a composite fiber containing a fiber component (A) of a polymer having a melting point lower than a melting point or a decomposition temperature of the synthetic pulp and a fiber component (B) of a polymer having a melting point substantially higher than that of the fiber component (A) maintaining a core-and-sheath or side-by-side relationship. It is desired that the low-melting point fiber component (A) and the high-melting point fiber component (B) are polymers of the same or different type. As the low-melting point fiber component (A), there can be used those exemplified above as the low-melting point polymers and as the high-melting point fiber component (B), there can be used those exemplified above in connection with the synthetic pulp. The ratio of the low-melting point point fiber component (A) to the high-melting point fiber component (B) should generally be from 90:10 to 0:90 on the weight basis and, particularly from 80:20 to 20:80 on the weight basis. When this composite fiber is used, the low-melting point component (A) works to heat-adhere the fibers and the high-melting point component (B) works to maintain the fibrous state even after the heat-adhesion.

The most desired fibrous binder is a composite fiber comprising cores of a high-melting point thermoplastic polyesters or copolyesters and sheaths of a low-melting point thermoplastic copolyester. This composite fiber is available as MELTY® 4080 (melt-adhering temperature, 110° C.) and 3380 (melt-adhering temperature, 130° C.) produced by Unitika Co.

As another fibrous binder that can be favorably used for the present invention, there can be exemplified a synthetic pulp of a linear low-density polyethylene (LLDPE).

The LLDPE should have a density of usually from 0.910 to 0.940 g/cm$^3$, and the pulp thereof can be prepared in the same manner as the aforementioned polyolefin-type synthetic pulp.

Though there is no particular limitation, the fibrous binder should have a fiber denier of usually from 0.1 d to 100 d and a fiber length of from 0.5 to 30 mm.

Auxiliary Fiber Components

The synthetic pulp sheet of the present invention may be blended with other synthetic fibers or inorganic fibers in order to impart strength or heat resistance to the sheet.

Examples of other synthetic fibers include a polypropylene fiber, a polyethylene fiber, a nylon fiber, a polyester fiber, an acrylic fiber, and a Modacryl fiber. Examples of the inorganic fibers include a glass fiber, a silica fiber, and a rock wool.

Sheet Making

According to the present invention, the synthetic pulp, binder and, as required, auxiliary fibers are mixed together and are slurried in water. The synthetic pulp should be used in an amount of 50 to 95% by weight and, particularly, 60 to 90% by weight and the binder should be used in an amount of 5 to 50% by weight and, particularly, 10 to 40% by weight When the auxiliary fibers are used, their amounts should be 40% by weight or less and, particularly, 30% by weight or less per the whole amount.

A mixed slurry is formed by dispersing the above mixture in water, defiberizing the mixture in an apparatus such as a pulper, a beader, as required, passing the mixture through a refiner.

In carrying out the wet-laid sheet-making, the mixed pulp slurry is fed onto a moving wire and is dehydrated. The wet-laid sheet-making is carried out by using a widely known paper-making machine such as a cylinder machine, a Fourdrinear machine, a twin-wire type sheet-making machine, or a Fourdrinier type sheet-making machine.

in the wet-laid sheet-making, spraying of a surfactant to the wet sheet on a wire prior to the dehydration by suction and/or dehydration by pressing is important for preparing a bulky pulp sheet. This fact will become readily apparent from the comparison of Examples 1 to 3 with the other Examples appearing later.

Addition of the surfactant makes the pulp sheet bulky probably because the surfaces of the fibers are wet well enabling the bonds among the fibers to be loosened and, further, permitting the dehydration to take place easily.

Addition of the surfactant contributes not only to making the synthetic pulp sheet bulky but also rendering the synthetic pulp sheet to be hydrophilic.

it is important to spray the surfactant in the form of an aqueous solution onto the wet sheet prior to effecting the suction. The aqueous solution is sprayed by using a known spray nozzle.

Here, the surfactant is sprayed in an amount of from 0.1 to 10% by weight and, preferably, from 0.5 to 5.0% by weight with respect to the amount (solid component) of the mixture though the amount may vary depending upon the wettability. It is desired that the surfactant is sprayed in a state of being diluted with water and is, usually, used at a concentration of from 0.1 to 10% by weight.

Examples of the surfactant include those of the anionic type, cationic type, ampholytic type ad non-ionic type. Among them, the anionic type surfactant is preferred because of its large wettability.

Examples of the anionic type surfactant include salts of fatty acid such as a potassium oleate soap, a sodium stearate soap and a mixed fatty acid soda soap, alkylsulfuric esters such as a sodium lauryl sulfate, a triethanolamine lauryl sulfate and an ammonium lauryl sulfate, alkylbenzene sulfonates such as a sodium dodecylbenzene sulfonate and the like, and an alkylnaphthalene sulfonate, an alkyl sulfosuccinate, an alkyldiphenyl sulfonate, an alkyl phosphate, a polyoxyethylene alkylsulfuric ester, a polyoxyethylene alkylarylsulfuric ester, an alkenyl succinate and an alkane sulfonate.

The wet sheet to which the surfactant is added is dehydrated by suction and is, as required, further dehydrated by pressing and is then dried.

The dried sheet is heat-treated to form melt-adhesion bonds of the binder among the fibers. The temperature of the heat treatment should be higher than the melting point of the binder but lower than the melting point of the synthetic pulp, as a matter of course.

The heat treatment is carried out by the method of the hot air through type in which the sheet placed on a mesh-like support member that is running is heated from the upper direction while evacuating the air from the lower direction, a method in which the low-melting point binder mixed in the sheet is melted by a hot roll to fix the synthetic pulp which is the chief component, a method in which the binder in the sheet is melt-adhered in a hot oven, and a method in which the binder is melted to adhere the webs by using a infrared-ray heater or by using ultrasonic energy. Among them, the method of the hot air-through type is preferably used from the standpoint of heat-treatment temperature and imparting bulkiness to the product.

The present invention uses a synthetic pulp having resistance against chemicals and a large surface area. Therefore, there is provided a synthetic pulp sheet which is not degraded or decomposed even after having absorbed chemicals such as strong acids or strong alkalis, and thus favorably holds the absorbed chemicals such as strong acids or strong alkalis.

Addition o the surfactant gives another effect that the synthetic pulp sheet of the present invention exhibits good hydrophilic property. By utilizing the above-mentioned properties, the synthetic pulp sheet can be used as a material for wiping spilled liquids or chemicals, as a material for absorption, as a separator for sealed lead storage batteries, as well as for a variety of applications where such properties are demanded.

PREFERRED EMBODIMENTS
EXAMPLES

The invention will be concretely described below by way of Examples and Comparative Examples. In Examples, the properties were measured in compliance with the methods described below.

(Measurement of specific surface area)

Measured by the absorbed amount of $N_2$ gas by the BET method.

(Measurement of drainage factor)

Except that the basis weight of the sheet was changed to 500 $g/m^2$, the time required for drainage factor of water was measured in a unit of seconds in accordance with the standards of TAPPI-T221.

The drainage factor is expressed by the time per gram of the pulp.

(Measurement of apparent density)

A test piece measuring 100 mm × 100 mm is picked up from the central portion of each of the ten sheets.

The thickness is measured at several arbitrary points of each of sheets under the load of 19.6 kPa (20 kgf/100 $cm^2$) by using a dial gauge of the class 1 specified under JIS B 7503 or by using a measuring instrument having accuracy equivalent to or higher than the above dial gauge, and an average value is found.

Then, the total mass of these ten test pieces is read up to 100 mg, an average mass per a test piece is determined, and the apparent density is found from the following relation, $$D = \frac{W}{10t}$$

D = apparent density of the sheet ($g/cm^3$),
W = average mass (g) of a test piece,
t = average thickness (mm) of a test piece.

(Measurement of air permeability)

The time required for the air to permeate is measured with the second as a unit i compliance with the method stipulated under JIS-P8117 but changing the amount of the permeating air to 300 ml.

The air permeability is expressed by the time required for 300 ml of the air to permeate through.

(Measurement of maximum pore diameter)

Measured by using an apparatus shown in FIG. 1. The measuring apparatus comprises a holder 1 and a ring 2 that can be fastened together with screws. The holder 1 has a gas-seeding portion 3 having an inner diameter of 15 mm, the ring 2 is equipped with an opening 4, and a sheet sample 5 to be measured is hermetically supported by the holder 1 and the ring 2. The holder 1 is connected through a pipe 6 to a gas ($N_2$) feeding port 7, and the end of the pipe 6 is connected to a manometer 9 containing a liquid ($H_2O$) for measuring the head.

A test piece 25 mm in diameter is mounted on the measuring apparatus and is immersed in methanol to substitute methanol for the volume of pores of the sheet. Then, a $N_2$ gas of an elevated pressure is introduced through the $N_2$ gas port, a differential pressure is read at a moment when bubbles ($N_2$ gas) evolve from the surface of the test piece, and a maximum pore diameter of the sample is found from the surface tension of methanol ($\sigma = 23$) in compliance with the following relation, Max. pore diameter (mm) =

$$\frac{4\sigma}{g\{\rho_1(H_2-H_1)-\rho_2 d\}} = \frac{0.004\sigma}{H_2-H_1} = \frac{0.092}{H_2-H_1}$$

$\sigma$ = surface tension of methanol dyn/cm,
g = gravitational acceleration cm/sec$^2$,
$H_2-H_1$ = difference of head in the manometer cm,
$\rho_1$ = density of liquid in the manometer g/cm$^3$,
$\rho_2$ = density of methanol g/cm$^3$,
d = depth of methanol cm.

(Method of measuring water-holding factor)

A total of three test pieces each measuring 100×100 mm are picked up from nearly the central portions of the three sheets. The mass under room temperature condition is measured up to 1 mg. The, the test piece is immersed being spread in distilled water maintained at room temperature (25°±2° C.), impregnated with water for 1 minute, pulled up from water, and the mass of the test piece is measured 30 seconds thereafter, in order to find the water-holding factor in compliance with the following relation.

$$A_0 = \frac{W_1 - W_0}{W_0}$$

$A_0$ = water-holding factor of the sheet,
$W_0$ = mass of the test piece of when it is dry (g),
$W_1$ = mass of the test piece of when it is impregnated with water (g).

(Length of fiber)

Measured by using an automatic fiber length measuring device, Model FS-200 manufactured by Finland Kayan, Co.

(Measurement of performance of lead storage battery)

A 5-hour-rate discharge capacity is the one in which a discharge current is set constant, i.e., 1.20 A (current with which the electric discharge terminates after about 5 hours) at a temperature of 25° C., time is measured until the terminal voltage of the cell becomes 1.70 V after the start of the discharge, and the measured time is regarded to be a discharge capacity.

A low-temperature high-rate discharge capacity is the one in which a discharge current is set to be 35 A constant at a temperature of −15° C., time is measured until the terminal voltage of the cell becomes 1.00 V after the start of the discharge, and the measured time is regarded to be a discharge capacity.

After 5-seconds voltage (V) is the one in which a terminal voltage of the cell is measured after 5 seconds have passed from the start of the discharge in the measurement of the low-temperature high-rate discharge capacity.

EXAMPLE 1

The following starting materials were used.
A. High-density polyethylene synthetic pulp.

| Average fiber length | 1.5 mm |
| Average fiber diameter | 20 μm |
| Specific surface area | 5.4 m$^2$/g |
| Drainage factor | 0.3 sec/g |
| Melting point | 135° C. |

B. Thermally-adhering polyester type composite fiber (MELTY 4080 produced by Unitika Co., fiber denier=2 denier, fiber length=5 mm, melt-adhering temperature, 110° C.)

The above starting materials A and B were mixed together at a ratio of A=80% by weight and B=20% by weight using a JIS-type pulper, and were formed into a sheet using a 25×25 cm square sheet-making machine. In preparing the sheet, the water level was once maintained just under the wire, so that the suction was not effected, and an aqueous solution containing 1.0% of an anionic surfactant (sodium dodecylbenzenesulfonate) was so sprayed onto the wet sheet that the amount of the surfactant was 1.0% by weight. Then, water was drained and the suction was effected. Thereafter, the couching, pressing and drying were effected in accordance with a method stipulated under JIS P8209. By using a circulation-type hot air drying machine, the obtained sheet was heat-treated at 135° C. for 5 minutes. The sheet crimped to some extent due to the heat treatment.

Properties of the obtained sheet were as shown in Table 1.

EXAMPLE 2

The following starting material was used.
C. High-density polyethylene synthetic pulp.

| Average fiber length | 1.2 mm |
| Average fiber diameter | 20 μm |
| Specific surface area | 8.2 m$^2$/g |
| drainage factor | 1.2 sec/g |
| Melting point | 135° C. |

A sheet was prepared in the same manner as in Example 1 but using the starting materials C and B at a ratio of C=80% by weight and B=20% by weight.

Properties of the obtained sheet were as shown in Table 1.

EXAMPLE 3

The following starting material was used.
D. Linear Low-density polyethylene synthetic pulp (low-melting point polyethylene synthetic pulp).

| Average fiber length | 1.0 mm |
| Average fiber diameter | 30 μm |
| Melting point | 125° C. |

A sheet was prepared in the same manner as in Example 1 but using the starting materials C and D at a ratio of C=80% by weight ad D=20% by weight, and using a sodium dodecylsulfosuccinate as the surfactant.

Properties of the obtained sheet were as shown in Table 1.

TABLE 1

| Item | Example 1 | Example 2 | Example 3 |
|---|---|---|---|
| Thickness (mm) | 4.2 | 3.2 | 2.7 |
| Basis weight (g/m$^2$) | 280 | 283 | 290 |
| Density (g/cm$^3$) | 0.066 | 0.089 | 0.109 |
| Air permeability (sec) | 0.1 | 0.5 | 1.0 |
| Water-holding factor (% by wt.) | 1300 | 910 | 875 |
| Max. pore diameter (μm) | 38 | 25 | 23 |

EXAMPLE 4

The following starting materials were used.
A. High-density polyethylene synthetic pulp.

| Average fiber length | 1.5 mm |
| --- | --- |
| Average fiber diameter | 20 μm |
| drainage factor | 0.3 sec/g |
| Melting point | 135° C. |

D. Linear low-density polyethylene synthetic pulp (low-melting point polyethylene synthetic pulp).

| Average fiber length | 1.0 mm |
| --- | --- |
| Average fiber diameter | 30 μm |
| Melting point | 125° C. | together at a ratio of A=70% by weight and a D=30% by weight using a JIS-type pulper, and were formed into a sheet by using a 25×25 cm square sheet-making machine. The obtained sheet was dried and was heat-treated at 130° C. for 5 minutes by using a circulation-type hot air drying machine.

As a result, there was obtained a bulky sheet having a basis weight of 320 g/m², a thickness of 2.13 mm and a bulk density of 0.15 g/cm³

EXAMPLE 5

The following starting material was used.
E. Polypropylene synthetic pulp.

| Average fiber length | 1.2 mm |
| --- | --- |
| Average fiber diameter | 30 μm |
| drainage factor | 0.2 sec/g |
| Melting point | 165° C. |

A sheet was prepared in the same manner as in Example 4 but using the starting materials D and E at a ratio of D=30% by weight and E=70% by weight.

The obtained sheet was a bulky one having a basis weight of 313 g/m², a thickness of 2.61 m and a bulk density of 0.12 g/cm³.

EXAMPLE 6

The following starting material was used.
F. Thermally melt-adhering composite fiber (MELTY 4080 produced by Unitika Co., fiber denier=4 d, fiber length=5 mm).

A sheet was obtained in the same manner as in Example 4 but using the starting materials A, D and F at a ratio of A=70% by weight, D=70% by weight and F=0% by weight.

The obtained sheet was a bulky one having a basis weight of 303 g/m², a thickness of 2.16 mm and a bulk density of 0.14 g/cm³.

COMPARATIVE EXAMPLE 1.

The following starting material was used.
G. High-density polyethylene synthetic pulp.

| Average fiber length | 1.5 mm |
| --- | --- |
| Average fiber diameter | 20 μm |
| Drainage factor | 6.3 sec/g |
| Melting point | 135° C. |

A sheet was prepared in the same manner as in Example 4 but using the starting materials D and G at a ratio of D=30% by weight and G=70% by weight.

The obtained sheet was a dense one having a basis weight of 310 g/m$^s$, a thickness of 1.5 mm and a bulk density of 0.27 g/cm³.

EXAMPLE 7

As a starting material, H: polyethylene terephthalate fibers (trademark, Ester EP 303 made by Kuraray Co., Ltd. (fiber denier 3 d, fiber length 5 mm, and a melting point 260° C.) were used, and a sheet was formed in the same way as in Example 4 except that A was used in an amount of 70% by weight, D was used in an amount of 20% by weight, and H was used in an amount of 10% by weight.

The resulting sheet was a bulky sheet having a basis weight of 310 g/m², a thickness of 2.38 mm and a bulk density of 0.13 g/cm³.

EXAMPLE 8

The following starting material was used.
I: low-density polyethylene powder having an average particle diameter of 40 micrometers and a melting point of 110° C.

A sheet was obtained in the same way as in Example 4 except that A was used in an amount of 70% by weight, I was used in an amount of 20% by weight, and H was used in an amount of 10% by weight.

The sheet obtained was a bulky sheet having a basis weight of 305 g/m², a thickness of 2.18 mm, and a bulk density of 0.14 g/cm$^s$.

EXAMPLE 9

The following starting material was used.
J: Glass fibers having a fiber diameter of 2 micrometers, and a fiber length of 5 mm.

A sheet was obtained in the same way as in Example 4 except that A was used in an amount of 70% by weight, D was used in an amount of 20% by weight, and J was used in an amount of 10% by weight.

The resulting sheet was a bulky sheet having a basis weight of 318 g/cm², a thickness of 2.45 mm and a bulk density of 0.3 cm³.

EXAMPLE 10

The following starting materials were used.
K. High-density polyethylene synthetic pulp.

| Average fiber length | 1.0 mm |
| --- | --- |
| Average fiber diameter | 8 μm |
| drainage factor | 0.5 sec/g |
| Melting point | 135° C. |

B. Thermally melt-adhering composite fiber (MELTY 4080 produced by Unitika Co , fiber denier=2 d, fiber length=5 mm). A sheet was prepared in the same manner as in Example 4 but using the starting materials K and B at a ratio of K=80% by weight and B=20% by weight, and effecting the heat treatment at 135 ° C. for 5 minutes.

Then, the anionic surfactant which was applied to carry out hydrophiliration was sprayed that the amount of the surfactant was 0.8% by weight and, drying.

Separator properties of the obtained sheet were as shown in Table 2. Table 3 shows the measured results of cell performance of when a battery was assembled by using the above sheet.

TABLE 2

| Item | Example 10 | Comparative Example 2 |
| --- | --- | --- |
| Thickness (mm) | 1.74 | 1.77 |
| Basis weight (g/m$^2$) | 262 | 319 |
| Density (g/cc) | 0.15 | 0.18 |
| Void fraction (%) | 85 | 93 |
| Electric resistance (Ωdm$^2$/piece) | 0.00100 | 0.00080 |
| Water-holding factor (% by wt.) | 980 | 1000 |
| Max. pore diameter (μm) | 27 | 20 |

TABLE 3

| | Example 10 | Comparative Example 2 |
| --- | --- | --- |
| 5-Hr-rate discharge capacity at 25° C., 1.20 A | 4 hr, and 12 min. | 4 hr, and 4 min. |
| Low-temp. high-rate discharge capacity at −15° C., 35 A | 2 min. and 8 sec. | 1 min. and 37 sec. |
| After 5-sec. voltage (V) | 1.59 | 1.57 |

COMPARATIVE EXAMPLE 2

For the purpose of comparing cell performance, a battery was assembled by using a glass separator which is the most general separator used for the sealed-lead storage batteries, and the cell performance was measured. The results were as shown in Table 3.

Properties of the glass separator were as shown in Table 2.

EXAMPLE 11

The following starting material was used. High-density polyethylene synthetic pulp.

| Average fiber length | 1.0 mm |
| --- | --- |
| Average fiber diameter | 10 μm |
| Rising temp. on a DSC curve | 108° C. |
| Melting point | 135° C. |
| Amount of PVA adhered | 2.0% (relative to synthetic pulp) |

The above synthetic pulp was dispersed in water at a concentration of 10 g/liter, heated at 120° C. in an autoclave, and was flashed into the atmospheric pressure through an orifice of 10 mm in diameter.

The obtained synthetic pulp was crimped to 6/10 with respect to the initial synthetic pulp in the direction of length. Observation using an electron microscope indicated that the synthetic pulp had been three-dimensionally crimped The drainage factor of the crimped synthetic pulp was 0.3 sec/g. The thus obtained crimped synthetic pulp was used as a starting material L to prepare a sheet in a manner as described below.

D. Linear low-density polyethylene synthetic pulp (low-melting point polyethylene synthetic pulp).

| Average fiber length | 1.0 mm |
| --- | --- |
| Average fiber diameter | 30 μm |
| Melting point | 125° C. |

The above starting materials L and D were mixed together at a ratio of L=70% by weight and a D=30% by weight using a JIS-type pulper, and were formed into a sheet by using a 25×25 cm square sheet-making machine. The obtained sheet was dried and was heat-treated at 130° C. for 5 minutes by using a circulation-type hot air drying machine, As a result, there was obtained a bulky sheet having a basis weight of 310 g/m$^2$, a thickness of 2.58 mm and a bulk density of 0.12 g/cm$^3$ The bulky sheet which has absorbed sulfuric acid was left to stand for seven days. However, the sheet did not change its color and did not lose its shape, either.

EXAMPLE 12

The following starting material was used. Polypropylene synthetic pulp.

| Average fiber length | 1.5 mm |
| --- | --- |
| Average fiber diameter | 30 μm |
| Rising temp. on a DSC curve | 135° C. |
| Melting point | 165° C. |
| Amount of PVA adhered | 1.5% (relative to synthetic pulp) |

The above synthetic pulp was dispersed in water at a concentration of 20 g/liter, heated at 150° C. in an autoclave, and was flashed into the atmospheric pressure through an orifice of 10 mm in diameter.

The obtained synthetic pulp was crimped to 7/10 with respect to the initial synthetic pulp in the direction of length. Observation using an electron microscope indicated that the synthetic pulp had been three-dimensionally crimped. The drainage factor of the crimped synthetic pulp was 0.3 sec/g.

By using the thus obtained crimped synthetic pulp as a starting material M, a sheet was obtained in the same manner as in Example 11 but using the starting materials M and D at a ratio of D=30% by weight and M=70% by weight.

The obtained sheet was a bulky one having a basis weight of 313 g/m$^2$, a thickness of 2.61 mm and a bulk density of 0.12 g/cm$^3$.

The bulky sheet was stable against acids like the sheet obtained in Example 11, and did not lose the shape.

EXAMPLE 13

The following starting material was used.
F. Thermally melt-adhering composite fiber (MELTY 4080 produced by Unitika Co., fiber denier=4 d, fiber length=5 mm).

A sheet was prepared in the same manner as in Example 11 but using the starting materials L, D and F at a ratio of L=70% by weight, D=20% by weight and F=10% by weight.

The obtained sheet was a bulky one having a basis weight of 305 g/m$^2$, a thickness of 2.77 mm and a bulk density of 0.11 g/cm$^3$.

The bulky sheet was stable against acids like the sheet obtained in Example 11, and did not lose the shape.

EXAMPLE 14

The following starting material was used.
B. Thermally melt-adhering composite fiber (MELTY 4080 produced by Unitika Co., fiber denier=2 d, fiber length=5 mm).

A sheet was obtained in the same manner as in Example 11 but using the starting materials L and B at a ratio of L=80% by weight and B=20% by weight.

The sheet was then treated with an anionic surfactant (an aqueous solution of a sodium dialkylsulfosuccinate) to render it to be hydrophilic, thereby to obtain a sheet containing 0.8% by weight of the surfactant The separator properties of the thus obtained sheet are shown in Table 4.

a battery was assembled by using the resulting sheet and the battery performances were measured. The results are shown in Table 5.

TABLE 4

| Item | Example 14 | Comparative Example 2 |
|---|---|---|
| Thickness (mm) | 1.85 | 1.77 |
| Basis weight (g/m$^2$) | 259 | 319 |
| Density (g/cc) | 0.14 | 0.18 |
| Void fraction (%) | 86 | 93 |
| Electric resistance ($\Omega$dm$^2$/piece) | 0.00086 | 0.00080 |
| Water-holding factor (% by wt.) | 990 | 1000 |
| Max. pore diameter ($\mu$m) | 27 | 20 |

TABLE 5

| | Example 14 | Comparative Example 2 |
|---|---|---|
| 5-Hr-rate discharge capacity at 25° C., 1.20 A | 4 hr, and 40 min. | 4 hr, and 4 min. |
| Low-temp. high-rate discharge capacity at −15° C., 35 A | 2 min. and 22 sec. | 1 min. and 37 sec. |
| After 5-sec. voltage (V) | 1.62 | 1.57 |

The preset invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A bulky synthetic pulp sheet containing 50 to 95% by weight of a synthetic pulp comprising fibers of synthetic polymer and having a drainage factor over a range of from 0.1 to 2.0 sec/g, and 5 to 50% by weight of a polymer binder having a melting point lower than a melting point or decomposition temperature of said synthetic pulp, said sheet being obtained by subjecting a mixture of said synthetic pulp and said polymer binder to wet-laid sheet-making and to heat treatment, and having an apparent density of 0.15 g/cm$^3$ or smaller, wherein said apparent density of said sheet is measured under a load of 200 g/cm$^2$, and obtained by the following formula:

$$D = \frac{w}{10t}$$

wherein D is the apparent density of the sheet (g/cm$^3$), W is the mass (g) of a piece of the sheet having a size of 100 mm × 100 mm, which is taken from a center portion of the sheet, and t is the average thickness (mm) of said piece.

2. A synthetic pulp sheet according to claim 1, wherein said sheet has a maximum pore diameter of 50 $\mu$m.

3. A synthetic pulp sheet according to claim 1, wherein the Garle air permeability is 5 sec/300 ml or smaller.

4. A synthetic pulp sheet according to claim 1, wherein the synthetic pulp sheet has a water-holding factor of 600% or greater.

5. A synthetic pulp sheet according to claim 1, wherein said polymer binder binds the fibers of said synthetic pulp to each other to form a net structure.

6. A synthetic pulp sheet according to claim 1, wherein the synthetic pulp is the one of a crystalline olefin polymer.

7. A synthetic pulp sheet according to claim 1, wherein the synthetic pulp is the one of a crimped fiber.

8. A synthetic pulp sheet according to claim 7, wherein said crimped fiber pulp in its crimped state has a fiber length which is from 2/10 to 8/10 that of in a straight state before being crimped.

9. A synthetic pulp sheet according to claim 1, wherein said polymer binder is a fibrous polymer binder of composite fibers comprising a fiber component (A) of a polymer having a melting point lower than said melting point or said decomposition temperature of said synthetic pulp and a fiber component (B) of a polymer having a melting point substantially higher than that of said fiber component (A), maintaining a core-and-sheath or side-by-side relationship.

10. A synthetic pulp sheet according to claim 9, wherein said fibrous binder is a composite fiber comprising cores of a high-melting thermoplastic polyester and sheaths of a low-melting thermoplastic copolyester.

11. A synthetic pulp sheet according to claim 1, wherein said fibers of synthetic polymer comprising said synthetic pulp comprises a linear low-density polyethylene.

12. A bulky synthetic pulp sheet containing:
50 to 95% by weight of a synthetic pulp having a drainage factor of from 0.1 to 2.0 sec/g comprising an olefin polymer which is selected from the group consisting of high-density polyethylene and a crystalline polypropylene; and
5 to 50% by weight of a composite fiber comprising cores of a thermoplastic polymer having a melting point higher than the melting point of said synthetic pulp and sheaths of a thermoplastic polymer having a melting point which is lower by at least 5° C. than the melting point of said synthetic pulp;
said bulky synthetic pulp sheet being formed by subjecting said synthetic pulp and said composite fiber to wet-laid sheet-making and to heat treatment, and having an apparent density of 0.15 g/cm$^3$ or smaller, wherein the apparent density of said sheet is as defined in claim 1 and is measured under a load of 200 g/cm$^2$.

13. A bulky synthetic pulp sheet containing:
60 to 90% by weight of a synthetic pulp having a drainage factor of from 0.1 to 2.0 sec/g comprising an olefin polymer which is selected from the group consisting of a high-density polyethylene and a crystalline polypropylene;
5 to 30% by weight of a composite fiber comprising cores of a thermoplastic polymer having a melting point higher than the melting point of said synthetic pulp and sheaths of a thermoplastic polymer having a melting point which is lower by at least 5°

C. than the melting point of said synthetic pulp; and 10 to 40% by weight of a linear low-density polyethylene having a melting point which is lower by at least 5° C. than the melting point of said synthetic pulp;

said bulky synthetic pulp sheet being formed by subjecting a mixture containing said components to wet-laid sheet-making and to heat treatment, and having an apparent density of 0.15 g/cm$^3$ or smaller under a load of 200 g/cm$^2$.

14. A bulky synthetic pulp sheet which is obtained by subjecting a mixture of 50 to 90% by weight of a synthetic pulp sheet having a drainage factor of at least 0.1 sec/g, but not larger than 1.0 sec/g, 5 to 30% of a binder having a melting point lower than the melting point or decomposition temperature of the synthetic pulp and 40% by weight or less of at least one member selected from the group consisting of synthetic fibers, composite heat adhering fibers, acid-resistant inorganic fibers and acid-resistant inorganic powders, to a wet-laid sheet-forming process, said pulp sheet having an apparent density of 0.15 g/cm$^2$ or less under a load of 200 g/cm$^2$.

15. A bulky synthetic pulp sheet which is obtained by subjecting a mixture of 50 to 90% by weight of synthetic pulp crimped three-dimensionally, 5 to 30% by weight of a binder which can be adhered at a lower temperature than the melting point or the decomposition temperature of said synthetic pulp, and 40% by weight or less of a reinforcing agent, to a wet-laid sheet-forming process, said pulp sheet having an apparent density of 0.15 g/cm$^3$ or less under a load of 200 g/cm$^2$.

16. A bulky synthetic pulp sheet obtained by subjecting a mixture of 50 to 90% by weight of a synthetic pulp having a drainage factor of at least 0.1 sec/g, but not larger than 2.0 sec/g, 5 to 30% by weight of a binder having a lower melting point than the melting point or the decomposition temperature of said synthetic pulp, and 0 to 40% by weight of at least one member selected from the group consisting of synthetic fibers, composite heat melt-adhering fibers, acid-resistant resistant inorganic fibers, and acid-resistant inorganic powders, to a wet-laid sheet-forming process, said pulp sheet having an apparent density of 0.15 g/cm$^3$ or less under a load of 200 g/cm$^2$ and a maximum pore diameter of 50 μm or less.

17. A synthetic pulp sheet according to claim 1, wherein said sheet further contains 40% by weight of less, per the entire content of said sheet, of auxiliary fibers, said sheet being obtained by subjecting a mixture of the synthetic pulp, the binder and the auxiliary fibers to wet-laid sheet-making followed by heat-treatment.

18. A separator for sealed lead storage batteries comprising said synthetic pulp sheet of claim 1.

19. A separator for sealed lead storage batteries comprising said synthetic pulp sheet of claim 12.

20. A process for preparing a bulky synthetic pulp sheet by subjecting to wet-laid sheet-making on a wire an aqueous slurry of a mixture of 50 to 95% by weight of a synthetic pulp having a drainage factor over a range of from 0.1 to 2.0 sec/g, and 5 to 50% by weight of a polymer binder having a melting point lower than the melting point or the decomposition temperature of said synthetic pulp, adding a surfactant during said wet-laid sheet-making prior to suction dehydration to produce a wet sheet, dehydrating said wet sheet, drying said sheet and heat-treating said sheet.

21. A process for preparing a bulky synthetic pulp sheet according to claim 20, wherein said surfactant is an anionic surfactant.

22. A process for preparing a bulky synthetic pulp sheet according to claim 20, wherein the surfactant is sprayed onto the sheet in an amount of from 0.1 to 10% by weight on the basis of solid component.

23. A process for preparing a bulky synthetic pulp sheet by subjecting to wet-laid sheet-making on a wire an aqueous slurry of a mixture of 50 to 95% by weight of crimped synthetic pulp having a drainage factor over a range of from 0.1 to 2.0 sec/g, 5 to 50% by weight of a fibrous polymer binder having a melting point lower than the melting point or the decomposition temperature of said synthetic pulp and dehydrating and drying the resulting sheet, and then heat-treating said sheet at a temperature which is higher than the melting point of the binder but lower than the melting point of the synthetic pulp.

24. A process for preparing a bulky synthetic pulp sheet according to claim 23, wherein the crimped synthetic pulp is the one of a crimped polyolefin.

25. A process for preparing a bulky synthetic pulp sheet, which comprises subjecting a mixture of 50 to 90% by weight of a synthetic pulp having a drainage factor of at least 0.1 sec/g and not larger than 2.0 sec/g, 5 to 30% by weight of a binder having a lower melting point than the melting point or the decomposition temperature of the synthetic pulp, and 0 to 40% by weight of at least one member selected from the group consisting of synthetic fibers, composite heat melt-adhering fibers, acid-resistant inorganic fibers, and acid-resistant inorganic powders to a wet-laid sheet-forming process on a wire, spraying a surfactant onto a resulting wet sheet formed on said wire, and thereafter, performing suction dehydrating and/or dehydrating under pressure, said synthetic pulp having an apparent density of not larger than 0.15 g/cm$^3$ under a load of 200 g/cm$^2$ and a maximum pore diameter of not larger than 50 μm.

26. A process according to claim 20, wherein said mixture of said aqueous slurry is further mixed with 40% by weight of less of auxiliary fibers.

27. A process according to claim 23, wherein said mixture of said aqueous slurry is further mixed with 40% by weight of less of auxiliary fibers.

* * * * *